United States Patent Office 2,824,105
Patented Feb. 18, 1958

2,824,105

STABILIZATION OF POLYMERIZABLE HETEROCYCLIC NITROGEN COMPOUNDS

Warren L. Smith and Mack F. Potts, Bartlesville, Okla., and Paul S. Hudson, Iowa City, Iowa, assignors to Phillips Petroleum Company, a corporation of Delaware No Drawing. Application November 17, 1952
Serial No. 321,041

12 Claims. (Cl. 260—290)

This invention relates to the stabilization of polymerizable materials. In one of its aspects, this invention relates to the stabilization of polymerizable heterocyclic nitrogen compounds under storage and handling conditions and during distillation or at elevated temperature. In another of its aspects this invention relates to method for preventing loss of heterocyclic nitrogen compounds due to polymerization.

It is well known that unsaturated, polymerizable heterocyclic nitrogen compounds tend to polymerize during storage and various handling conditions, especially during distillation and consequently yield and recovery of these compounds are often considerably diminished because of this unwanted and undesirable polymerization. Also, besides reducing yields and recovery of these polymerizable heterocyclic nitrogen compounds, often the polymerized material adversely affects the reactions wherein these polymerizable compounds are employed as reactants, as well as the products which are derived from these reactions.

Each of the objects of this invention will be obtained by at least one of the aspects of this invention.

It is an object of this invention to prevent and/or inhibit the polymerization of polymerizable heterocyclic nitrogen compounds during storage and other handling conditions. It is another object of this invention to inhibit the polymerization of these materials at an elevated temperature and especially during distillation. It is still another object of this invention to provide polymerization inhibited compositions comprising a polymerizable inhibited compositions comprising a polymerizable heterocyclic nitrogen compound. It is yet another object of this invention ot provide a polymerization inhibited composition comprising a vinyl-substituted pyridine. It s yet another object of this invention to provide a polymerization inhibited composition comprising a vinyl-substituted pyrrole.

In accordance with this invention, it has now been found that dinitrochlorophenols are effective as polymerization inhibitors for polymerizable heterocyclic nitrogen compounds. Dinitrochlorophenols which are applicable are compounds which can be represented by the formula

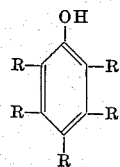

wherein R is selected from the group consisting of hydrogen, chloro, and nitro groups and one chloro and two nitro groups are present. Specific dinitrochlorophenols which are applicable in the practice of this invention include 2,6-dinitro-4-chlorophenol, 2,4-dinitro-6-chlorophenol, 2,4-dinitro-3-chlorophenol, and 2,5-dinitro-4-chlorophenol, as well as other dinitrochlorophenols.

The dinitrochlorophenols herein described are effective as polymerization inhibitors over a wide range of temperatures, from below 40° F. to above 400° F. The amount of these polymerization-inhibiting dinitrochlorophenols which need be added to inhibit polymerization usually varies with the amount and the type of polymerizable heterocyclic nitrogen compounds to be inhibited. Often a trace of these dinitrochlorophenols is sufficient in the presence of a polymerizable heterocyclic nitrogen compound to inhibit the polymerization of these compounds. Usually an amount of dinitrochlorophenol in the range of 0.001 to 5 percent by weight, preferably in the range of 0.05 to 1.0 percent based on the weight of the polymerizable heterocyclic nitrogen compounds, is sufficient. Larger amounts of the dinitrochlorophenols, even as high as 10 percent by weight and higher can be used if desired, although under most circumstances this is not necessary. These stabilizing agents are effective in the anhydrous systems as well as in systems where water is present. Dinitrochlorophenols are generally added to the polymerizable heterocyclic nitrogen compound in the form of fine powder and the mixture is stirred and/or warmed.

The dinitrochlorophenols, in order to be especially effective, should preferably be in intimate contact with the polymerizable heterocyclic nitrogen compounds. If desired, after addition of the dinitrochlorophenols to a polymerizable heterocyclic nitrogen compound, the admixture may be stirred to promote dispersion and/or solution of the dinitrochlorophenols therein.

The recovery of these dinitrochlorophenols from the polymerizable heterocyclic nitrogen compounds with which they are admixed is relatively simple and easily effected. After storage, handling or shipment of the stabilized, polymerization-inhibited heterocyclic nitrogen compounds, the compounds can be easily and readily separated and recovered from the polymerization-inhibiting dinitrochlorophenol, either by distillation, preferably under reduced pressure, or any other convenient method.

Preferred polymerizable heterocyclic nitrogen compounds which can be stabilized in accordance with our invention are the mono- and divinylpyridines, with the vinyl group being present in any of the several positions in the pyridine nucleus. Alkyl groups can be present on the ring or on the alpha carbon atom of the vinyl group, but the number of carbon atoms in the combined alkyl groups should generally not be greater than 12. These alkyl groups are preferably methyl and ethyl groups. These preferred vinylpyridine compounds have the structural formula:

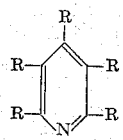

where R is selected from the group consisting of hydrogen, alkyl, vinyl, and isopropenyl (alpha-methylvinyl) groups; at least one and not more than two of said groups being vinyl or alpha-methylvinyl; and the total number of carbon atoms in the alkyl groups being not greater than 12. Examples of such compounds are 2-vinylpyridine; 3-vinylpyridine; 4-vinylpyridine; 2,5-divinylpyridine; 2-methyl-5-vinylpyridine; 2-vinyl-5-ethylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine; 2-isopropyl-4-nonyl-5-vinylpyridine; 2-methyl-5-undecyl-3-vinylpyridine; 3-dodecyl-4,5-divinylpyridine; 2,4-dimethyl-5,6-dipentyl-3-vinylpyridine; 2-decyl-5-(alpha-methylvinyl) pyridine; 3,5-di(alpha-methylvinyl) pyridine; and the like.

Those skilled in the art will appreciate that for the purposes of this invention the polymerization of compounds of the above nature substituted with non-interfering groups, for example halo- and nitro-, can also be inhibited.

Other polymerizable heterocyclic nitrogen compounds which can be used in the practice of this invention include those vinyl and alpha-methylvinyl substituted heterocyclic nitrogen compounds in which the ring structure is unsaturated, partially saturated and completely saturated. Examples include vinyl and alpha-methylvinyl-substituted quinolines, isoquinolines, piperidines (hexahydropyridines), pyrroles, pyrrolidines, pyrrolidones, especially the vinyl-substituted pyrrolidones, piperidines, pyrroles, pyrrolidines, quinolines, isoquinolines, dihydro and tetrahydropyridines, partially hydrogenated quinolines and isoquinolines, and pyrrolines (dihydropyrroles) and alkyl derivatives of the foregoing compounds. Examples of such compounds are 2-vinylquinoline; 8-ethyl-2-vinylquinoline; 4-hexyl-5-vinylquinoline; 1-vinylisoquinoline; 5-methyl-1-isopropenylisoquinoline; 1,8-divinylisoquinoline; N-vinylpyrrolidone; 3-vinylpyrrolidone; N-vinylpyrrole; 4-vinylpyrrole; 3-vinylpiperidine; N-vinylpyrrolidine; 3-vinylpyrrolidine; N-vinylcarbazole; and 5-vinylcarbazole and the like.

The following examples are illustrative of this invention and specific details for operating the present invention are described with comparative results, showing the improvements obtained by this invention. However, as indicated, these examples are merely illustrative and not limitive of this invention.

*Example I*

The effectiveness of 2,6-dinitro-4-chlorophenol as an inhibitor for the polymerization of 2-methyl-5-vinylpyridine was determined by adding 0.3 percent by weight of this compound to 2-methyl-5-vinylpyridine and heating the mixture in an atmosphere of nitrogen for 24 hours at 185° F. The unreacted 2-methyl-5-vinylpyridine was removed by vacuum distillation at a pressure less than 1 mm. Hg. The polymer which remained was weighed and the percent 2-methyl-5-vinylpyridine polymerized was calculated. A second run was made in which no additive was present. The following results were obtained:

| Additive | Percent 2-Methyl-5-Vinyl-pyridine Polymerized |
|---|---|
| 2,6-Dinitro-4-chlorophenol | 2.03 |
| None | 23.0 |

*Example II*

Runs were made to determine the effectiveness of the following compounds as inhibitors for the polymerization of 2-methyl-5-vinylpyridine: m-dinitrobenzene, o-dinitrobenzene, o-nitrochlorobenzene, 2,4-diaminophenol hydrochloride, 2-amino-5-nitrophenol, and 2,4,6-trichlorophenol. The amount of each compound employed was 0.3 weight percent based on the 2-methyl-5-vinylpyridine. The mixtures were heated in an atmosphere of nitrogen for 24 hours at 200° F. These materials were found to be ineffective as polymerization inhibitors. In each test the sample became very viscous and in appearance was similar to a run in which 2-methyl-5-vinylpyridine was heated under the same conditions in the absence of an additive.

*Example III*

A run was made similar to those in Example I to test the effectiveness of 2,6-dinitro-4-chlorophenol as a polymerization inhibitor in a sample of 2-methyl-5-vinylpyridine containing 5 percent by weight of water. The result was as follows:

| Additive | Percent 2-Methyl-5-Vinyl-pyridine Polymerized |
|---|---|
| 2,6-Dinitro-4-chlorophenol | 2.01 |

As will be obvious to those skilled in the art, many substitutions, variations or modifications can be made in the light of the foregoing disclosure, without departing from the spirit or scope of this disclosure or invention.

We claim:

1. A polymerizable heterocyclic nitrogen compound having the formula

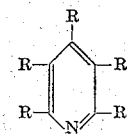

where R is selected from the group consisting of hydrogen, alkyl, vinyl, and isopropenyl (alpha-methylvinyl) groups, at least one and not more than two of said groups being selected from the group consisting of vinyl and isopropenyl groups, the total number of carbon atoms in the alkyl groups being not greater than 12 containing a stabilizing amount of a dinitrochlorophenol having the formula

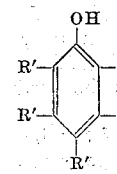

where R' is selected from the group consisting of hydrogen, chloro- and nitro-groups wherein one R' group is a chloro- and two R' groups are nitro-groups.

2. The composition of claim 1 wherein said dinitrochlorophenol is present in an amount of between 0.001 and 5.0 percent by weight based upon the polymerizable heterocyclic nitrogen compound.

3. The composition of claim 1 wherein said dinitrochlorophenol is present in an amount of between 0.05 and 1.0 percent by weight based upon the polymerizable heterocyclic nitrogen compound.

4. The composition of claim 1 wherein said dinitrochlorophenol is 2,6-dinitro-4-chlorophenol.

5. The composition of claim 1 wherein said dinitrochlorophenol is 2,4-dinitro-6-chlorophenol.

6. The composition of claim 1 wherein said dinitrochlorophenol is 2,4-dinitro-3-chlorophenol.

7. The composition of claim 1 wherein said dinitrochlorophenol is 2,5-dinitro-4-chlorophenol.

8. A composition comprising 2-methyl-5-vinylpyridine and a stabilizing amount of 2,6-dinitro-4-chlorophenol.

9. The composition of claim 1 wherein the heterocyclic nitrogen compound is vinylpyridine.

10. The composition of claim 1 wherein the heterocyclic nitrogen compound is isopropenyl pyridine.

11. The composition of claim 1 wherein the heterocyclic nitrogen compound is 2-methyl-5-vinylpyridine.

12. A process for inhibiting the polymerization of a compound having the formula

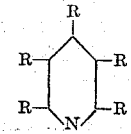

where R is selected from the group consisting of hydrogen, alkyl, vinyl, and isopropenyl (alpha-methylvinyl) groups, at least one and not more than two of said groups being selected from the group consisting of vinyl and isopropenyl groups, the total number of carbon atoms in the alkyl groups being not greater than 12, said process comprising adding to said compound a polymerization inhibiting amount of a dinitrochlorophenol having the formula

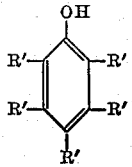

where R' is selected from the group consisting of hydrogen, chloro and nitro groups, wherein one R' group is chloro and two R' groups are nitro.

References Cited in the file of this patent

UNITED STATES PATENTS

| | | |
|---|---|---|
| 2,304,728 | Boyer et al. | Dec. 8, 1942 |
| 2,443,217 | Amos et al. | June 15, 1948 |
| 2,556,845 | Kauffman | June 12, 1951 |
| 2,611,769 | Hays | Sept. 23, 1952 |